C. B. FRANKLIN.
HANDLE BAR BRACKET FOR MOTOR CYCLES.
APPLICATION FILED JUNE 25, 1920.
1,405,107.
Patented Jan. 31, 1922.
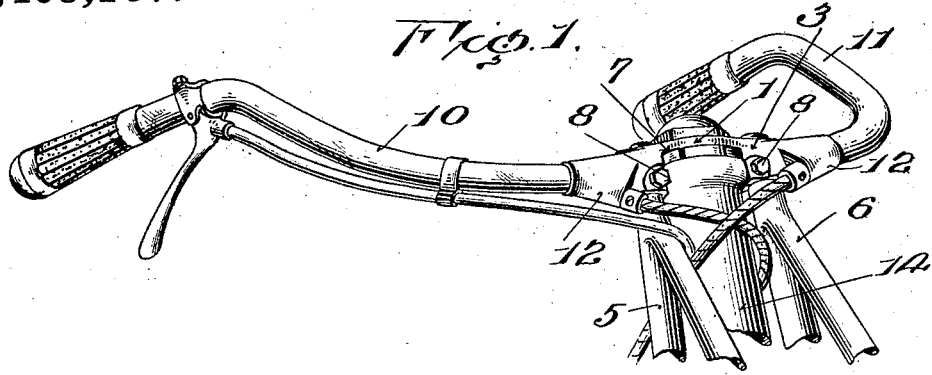
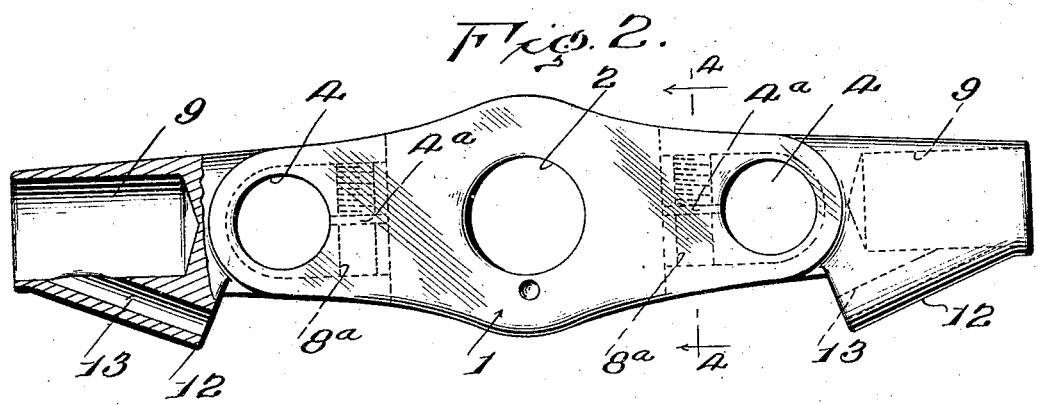
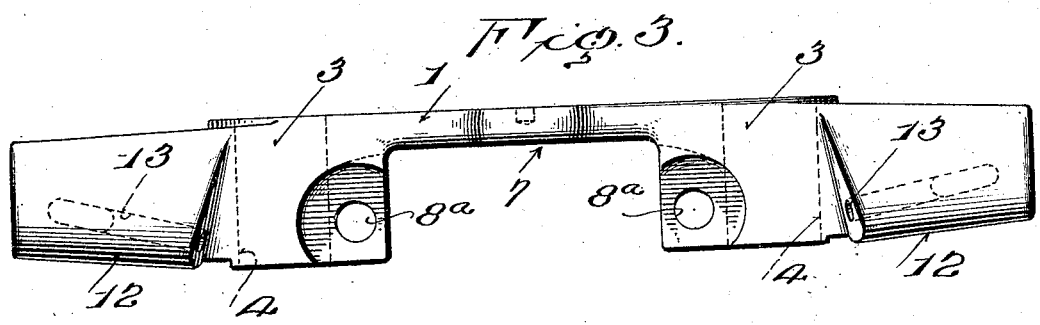
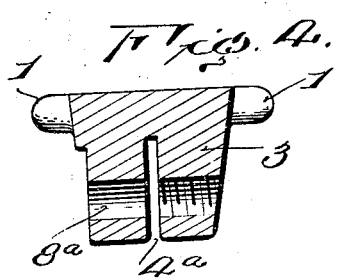
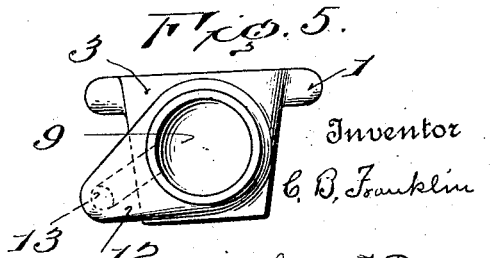
Inventor
C. B. Franklin
By Sturtevant & Mason
Attorneys

UNITED STATES PATENT OFFICE.

CHARLES BAYLY FRANKLIN, OF SPRINGFIELD, MASSACHUSETTS, ASSIGNOR TO HENDEE MANUFACTURING COMPANY, OF SPRINGFIELD, MASSACHUSETTS, A CORPORATION OF MASSACHUSETTS.

HANDLE-BAR BRACKET FOR MOTOR CYCLES.

1,405,107.  Specification of Letters Patent.  Patented Jan. 31, 1922.

Application filed June 25, 1920. Serial No. 391,628.

*To all whom it may concern:*

Be it known that I, CHARLES B. FRANKLIN, a subject of the King of England, whose first nationalization papers have been taken out as a citizen of the United States, residing at Springfield, in the county of Hampden, State of Massachusetts, have invented certain new and useful Improvements in Handle-Bar Brackets for Motor Cycles, of which the following is a description, reference being had to the accompanying drawing, and to the figures of reference marked thereon.

The invention relates to new and useful improvements in motorcycles, and more particularly to a handle bar bracket whereby the handle bars are secured to the front fork for steering the motorcycle.

An object of the invention is to provide a handle bar bracket construction wherein the front fork is secured directly and rigidly to the handle bar bracket and wherein said handle bar bracket is provided with means for rigidly supporting the handle bars.

In the drawings:—

Figure 1 is a perspective view of part of a motorcycle showing my improved bracket applied thereto;

Fig. 2 is a plan view of the handle bar bracket with the associated parts detached;

Fig. 3 is a side view of the construction shown in Fig. 2;

Fig. 4 is a sectional view on the line 4—4 of Fig. 2; and

Fig. 5 is an end view of the bracket.

The invention is directed broadly to a bracket for connecting the handle bars to the front fork of a motorcycle and consists of a central bracket section adapted to be secured to the steering post, and pivotally connected to the main frame. In each side of the central section of the bracket are sockets adapted to receive the upper ends of the front fork, and means is provided for rigidly securing these ends in the sockets. The bracket is also provided with projecting portions having sockets in which the handle bars are brazed or otherwise rigidly secured.

Referring more in detail to the drawings, I have shown my improved handle bar bracket as consisting of a central section 1 which is formed with an opening 2 to receive the upper end of the steering post, and thus providing means for connecting the same to the bracket. Said bracket is enlarged at each end, as indicated at 3, and in these enlarged ends there are sockets 4—4. The socket 4 on one side of the bracket receives the upper end of one of the fork members 5, while the socket at the other side of the bracket receives the upper end of the other fork member 6. These enlargements 3—3 extend downward from the upper plane of the bracket and thus form a recessed portion 7. The metal of the bracket forming the enlargements 3 is split at the lower end, as indicated at $4^a$. Clamping bolts 8 extend into openings $8^a$ and serve as means for drawing the split sections together, and thus causing the bracket to be rigidly clamped to the upper ends of the fork members 5 and 6. The bracket 1 projects beyond the socket members 4—4 at each end thereof and is provided with horizontally disposed sockets 9—9 adapted to receive the respective handle bars 10 and 11. The handle bars may be brazed in these sockets or otherwise rigidly secured therein. The bracket is also provided with a laterally projecting lug 12 at each end thereof which is bored as at 13 to provide an opening for the passage of the flexible shafts leading from the respective grips of the handle bars.

From the above, it will be apparent that the handle bars through the bracket are rigidly connected to the front fork, and thus a very durable and rigid connection is provided for the steering of the motorcycle. The handle bar bracket is also centrally disposed about the axis of the steering head. The front supporting sleeve 14 of the main frame extends up into the recess 7 and this makes a very compact structure and a pleasing design.

It is obvious that minor changes in the details of construction may be made without departing from the spirit of the invention as set forth in the appended claims.

Having thus described the invention, what is claimed as new is:—

1. In a motorcycle, an integral bracket, means for rigidly connecting the front fork to said bracket, independent means for pivotally connecting the main frame to said bracket, and means for connecting the handle bars to said bracket.

2. In a motorcycle, a bracket having sockets for the upper ends of the members of the front fork, means for rigidly securing said fork members in said sockets, means for securing handle bars to said bracket, and independent means for pivotally connecting the bracket to the main frame.

3. In a motorcycle, a bracket having a central opening for connection to the steering head, sockets at each side thereof adapted to receive the upper ends of the members of the front fork, means for rigidly securing said fork members in said sockets, said bracket having projecting parts beyond said sockets, and means for rigidly securing the handle bars to said projecting parts.

4. In a motorcycle, a bracket having a central opening for connection to the steering head, sockets at each side thereof adapted to receive the upper ends of the members of the front fork, means for rigidly securing said fork members in said sockets, said bracket having projecting parts beyond said sockets, and means for rigidly securing the handle bars to said projecting parts, each of said projecting parts having a lug formed with an opening through which the flexible shafts in the respective handle bars extend.

5. A handle bar bracket for motorcycles comprising a central section having an opening therein adapted to receive the steering post, an enlarged portion at each side of said central section provided with sockets adapted to receive the upper ends of the members of the front fork, said enlarged portions being split, and clamping bolts for drawing the split sections together to clamp the upper ends of the fork in the sockets, said bracket having projecting parts each provided with a horizontal socket in which the respective handle bars may be brazed.

6. A handle bar bracket for motorcycles comprising a central section having an opening therein adapted to receive the steering post, an enlarged portion at each side of said central section provided with sockets adapted to receive the upper ends of the members of the front fork, said enlarged portions being split, and clamping bolts for drawing the split sections together to clamp the upper ends of the fork in the sockets, said bracket having projecting parts each provided with a horizontal socket in which the respective handle bars may be brazed, each of said projecting parts at the ends of the brackets having laterally extending lugs formed with openings through which the respective flexible shafts of the respective handle bars extend.

In testimony whereof I affix my signature.

CHARLES BAYLY FRANKLIN.